(12) United States Patent
Lam et al.

(10) Patent No.: US 10,488,941 B2
(45) Date of Patent: Nov. 26, 2019

(54) COMBINING VIRTUAL REALITY AND AUGMENTED REALITY

(71) Applicant: ZYETRIC TECHNOLOGIES LIMITED, Kowloon (HK)

(72) Inventors: Pak Kit Lam, Kowloon (HK); Peter Han Joo Chong, Kowloon (HK)

(73) Assignee: Zyetric Technologies Limited, Kowloon (HK)

( * ) Notice: Subject to any disclaimer, the term of this patent is extended or adjusted under 35 U.S.C. 154(b) by 0 days.

(21) Appl. No.: 16/198,691

(22) Filed: Nov. 21, 2018

(65) Prior Publication Data

US 2019/0087015 A1 Mar. 21, 2019

Related U.S. Application Data

(63) Continuation of application No. PCT/CN2017/117746, filed on Dec. 21, 2017.
(Continued)

(51) Int. Cl.
*G06F 3/01* (2006.01)
*G06T 19/00* (2011.01)
(Continued)

(52) U.S. Cl.
CPC ............ *G06F 3/017* (2013.01); *A63F 13/213* (2014.09); *A63F 13/2145* (2014.09); *G06F 3/04845* (2013.01); *G06F 3/04883* (2013.01); *A63F 2300/1075* (2013.01); *A63F 2300/1093* (2013.01); *A63F 2300/8082* (2013.01); *G06F 3/0346* (2013.01); *G06F 2203/04808* (2013.01);
(Continued)

(58) Field of Classification Search
CPC . G06T 2219/024; G06T 19/006; G06F 3/017; G06F 3/041; G06F 3/044; G06F 3/04845; G06F 3/04842; G06F 3/011; G06F 1/1626; G06F 1/1686
See application file for complete search history.

(56) References Cited

U.S. PATENT DOCUMENTS 9,978,202 B2 * 5/2018 Keilwert ............. G07F 17/3211

FOREIGN PATENT DOCUMENTS

| CN | 104063039 A | 9/2014 |
|---|---|---|
| CN | 105224211 A | 1/2016 |

(Continued)

OTHER PUBLICATIONS

International Preliminary Report on Patentability received for PCT Patent Application No. PCT/CN2017/117746, dated Jul. 4, 2019, 6 pages.
(Continued)

*Primary Examiner* — Xuemei Zheng
(74) *Attorney, Agent, or Firm* — Morrison & Foerster LLP

(57) ABSTRACT

At an electronic device having a display, a first sensor, and a second sensor different than the first sensor, a view is displayed on the display. The view includes an interface object at a first location. A first gesture is detected based on first data from the first sensor, wherein the first gesture identifies the interface object. A second gesture is detected based on second data from the second sensor. A second location is determined for the interface object based on the second gesture. The display of the interface object is updated from the first location to the second location in the view.

20 Claims, 17 Drawing Sheets

Related U.S. Application Data

(60) Provisional application No. 62/437,539, filed on Dec. 21, 2016.

(51) Int. Cl.
  *A63F 13/213* (2014.01)
  *A63F 13/2145* (2014.01)
  *G06F 3/0488* (2013.01)
  *G06F 3/0484* (2013.01)
  *G06F 3/0346* (2013.01)
  *G06K 9/00* (2006.01)

(52) U.S. Cl.
  CPC ........ *G06K 9/00355* (2013.01); *G06T 19/006* (2013.01); *G06T 2219/024* (2013.01)

(56) References Cited

FOREIGN PATENT DOCUMENTS

| | | |
|---|---|---|
| CN | 105955456 A | 9/2016 |
| CN | 106200944 A | 12/2016 |
| WO | 2018/113740 A1 | 6/2018 |

OTHER PUBLICATIONS

International Search Report and Written Opinion received for PCT Patent Application No. PCT/CN2017/117746, dated Apr. 3, 2018, 7 pages.

\* cited by examiner

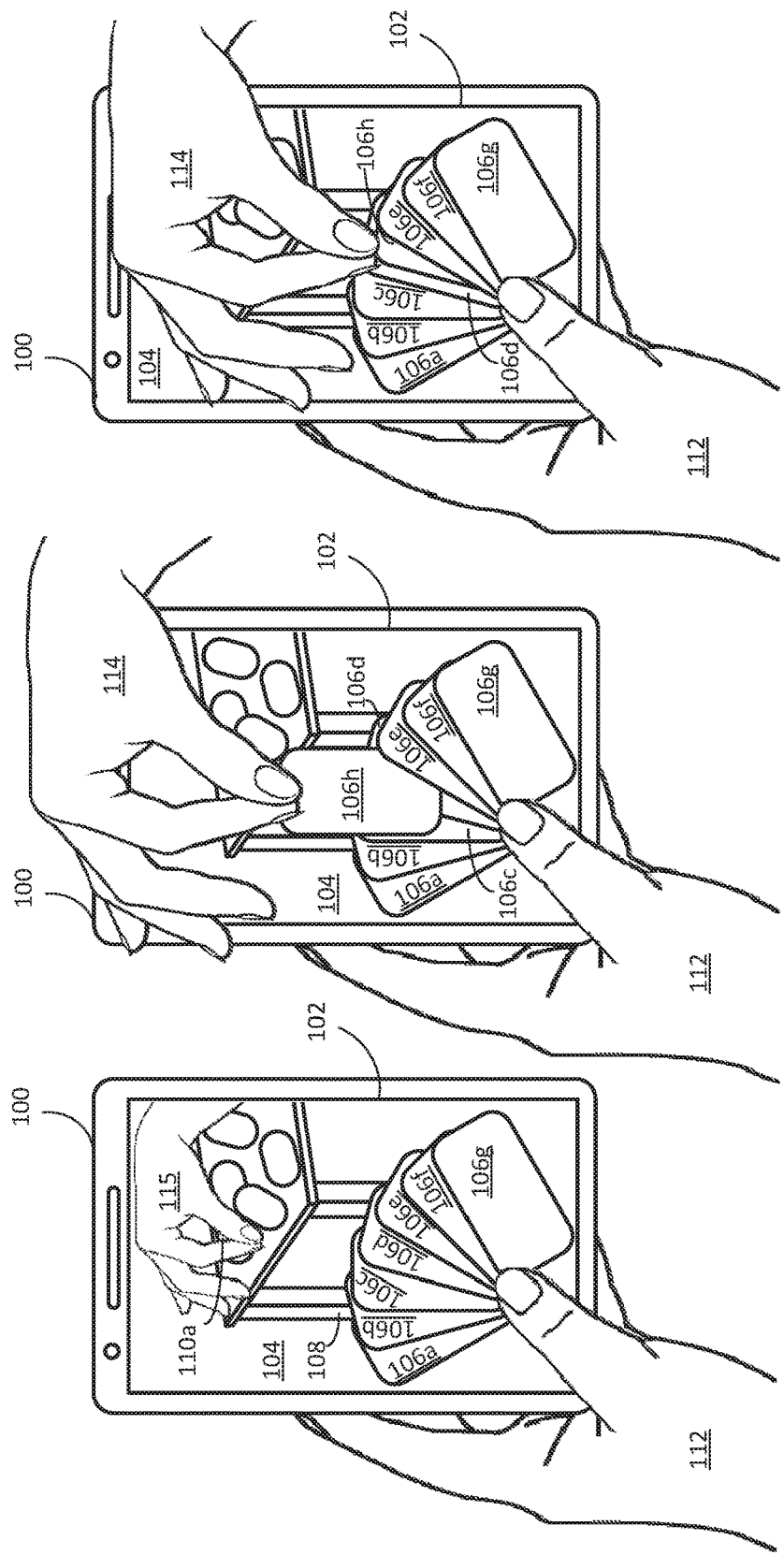

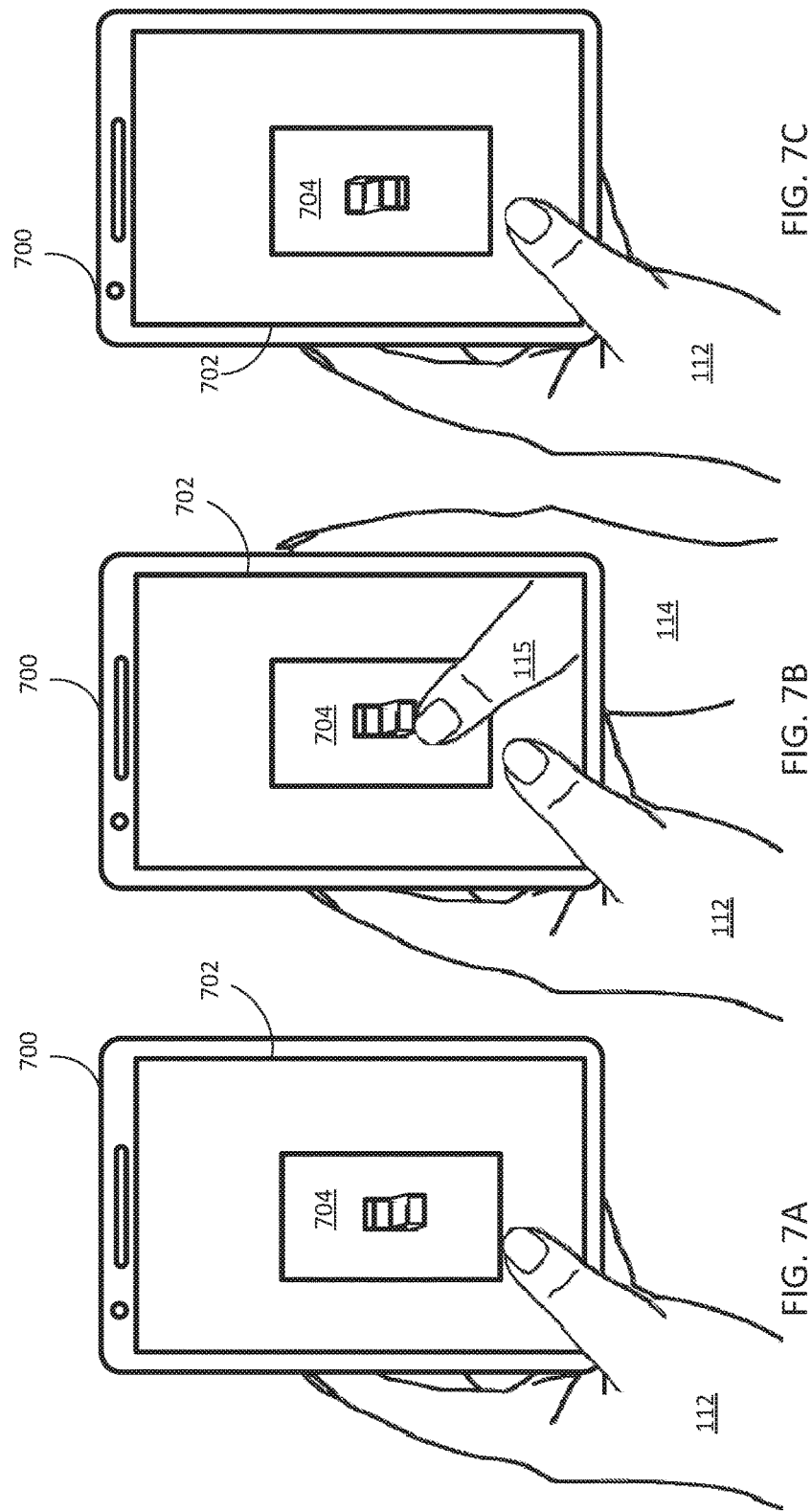

COMBINING VIRTUAL REALITY AND AUGMENTED REALITY

CROSS-REFERENCE TO RELATED APPLICATIONS

This application is a continuation of International Patent Application No. PCT/CN2017/117746, "Combining Virtual Reality and Augmented Reality," filed Dec. 21, 2017, which claims priority to U.S. Provisional Patent Application Ser. No. 62/437,539, "Combining Virtual Reality and Augmented Reality," filed Dec. 21, 2016. The content of these applications is hereby incorporated by reference for all purposes.

FIELD

The present disclosure relates to augmented and/or virtual reality environments and, more specifically, to interacting with augmented and/or virtual reality environments.

BACKGROUND

Virtual reality (VR) environments are entirely or mostly computer generated environments. While they may incorporate images or data from the real world, VR environments are computer generated based on the parameters and constraints set out for the environment. In contrast, augmented reality (AR) environments are largely based on data (e.g., image data) from the real world that is overlaid or combined with computer generated objects and events. Aspects of these technologies have been used separately using dedicated hardware.

SUMMARY

Below, embodiments of inventions are described that allow for interactions with VR and/or AR technologies on various hardware platforms, including general purpose hardware devices. The interactive virtual/augmented reality (IVAR) technologies described herein present an improved method for using these technologies and the open possibility of using the technologies on new platforms.

In an exemplary embodiment of a method according to the present technology, at an electronic device having a display, a first sensor, and a second sensor different than the first sensor, a view is displayed on the display. The view includes an interface object at a first location. A first gesture is detected based on first data from the first sensor, wherein the first gesture identifies the interface object. A second gesture is detected based on second data from the second sensor. A second location is determined for the interface object based on the second gesture. The display of the interface object is updated from the first location to the second location in the view.

BRIEF DESCRIPTION OF THE FIGURES

The present application can be best understood by reference to the figures described below taken in conjunction with the accompanying drawing figures, in which like parts may be referred to by like numerals.

FIGS. 3A-3C depict steps for moving objects between locations in AR and/or VR environments according to some embodiments of the present technology.

FIGS. 7A-7C depict examples of interacting with AR and/or VR environments according to some embodiments of the present technology.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

In some embodiments of present technology, VR and/or AR technologies are combined with motion/accelerometer/touch gestures to produce realistic experience in games or real-life applications. The following definitions are used below:

Local Object—The objects that are "local" to the user and are not "seen" from the front- or back-facing camera. In other words, these are computer generated objects being displayed on the screen of the smart device but are not part of the AR and/or VR environment in a way that is accessible to other users.

IVAR Background—The real-time "background" view seen from the back-facing camera in some IVAR games (e.g., card games) or applications.

IVAR Object—The computerized object overlaid onto the IVAR Background. In contrast to local objects, these objects are shared among other users (when present) of the AR and/or VR environment.

IVAR View—A display of the combined IVAR Background and IVAR Object(s) and/or Local Object(s). For example, the display may be of the view generated from a virtual camera in or a virtual portal into an AR and/or VR environment. The positioning of the virtual camera is optionally based on position and/or orientation of the smart device that is displaying the view.

While a card game is used as an example to explain an embodiment of the present technology below, the inventive concepts disclosed herein can be used in any number of applications, including other games, computer aided design, communication, and other applications.

Figure 1B:
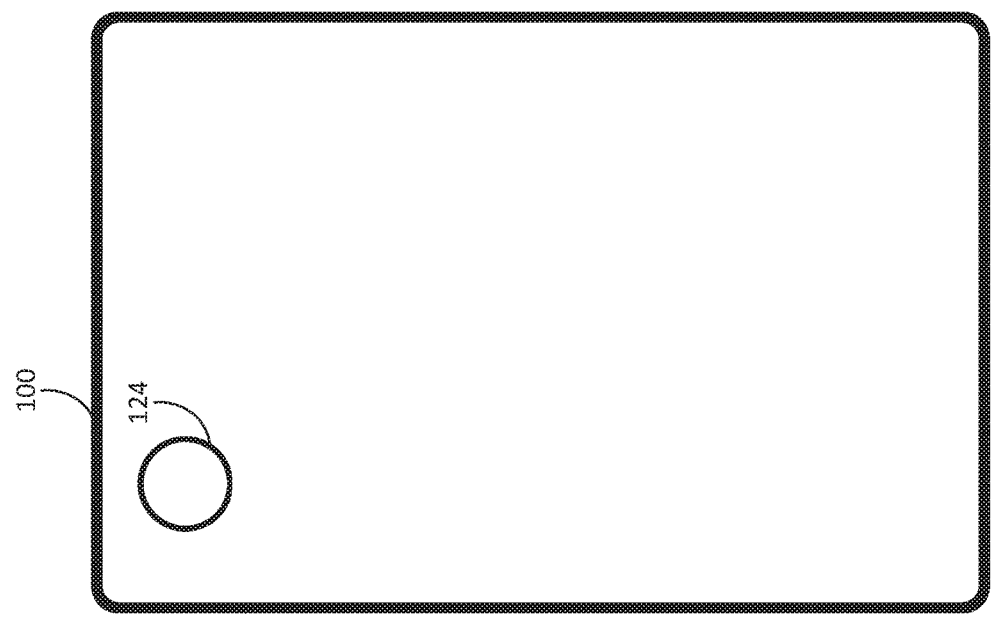
FIGS. 1A-1B depict an exemplary electronic device that implements some embodiments of the present technology.
Figure 1A:
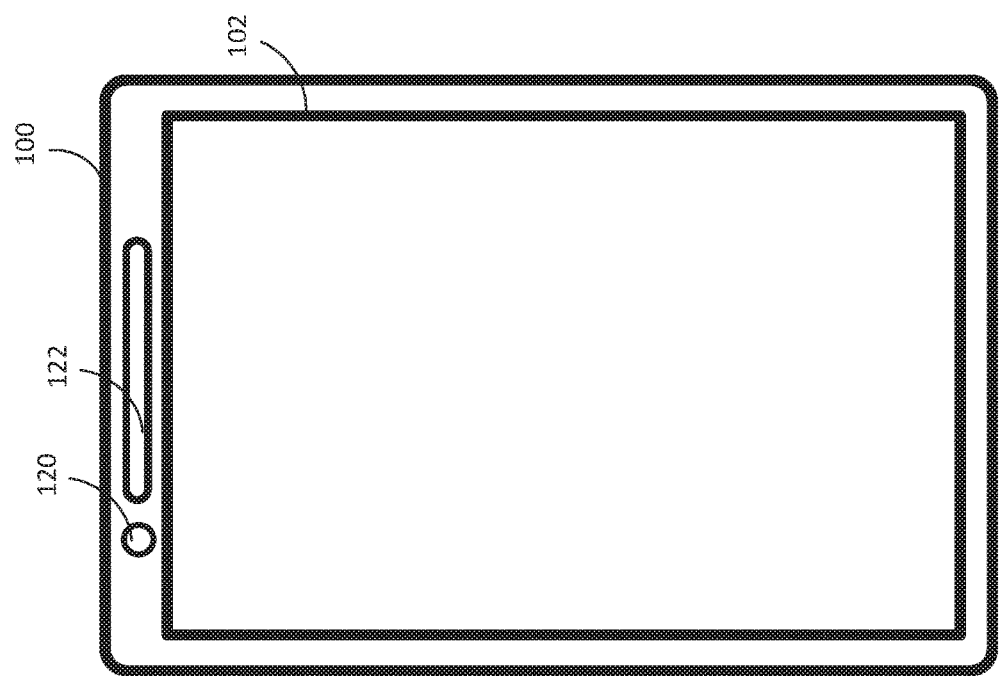

FIGS. 1A-1B depict smart device 100 that optionally implements some embodiments of the present invention. In some examples, smart device 100 is a smart phone or table computing device but the present technology can also be implemented on other types of specialty electronic devices, such as wearable devices or a laptop computer. In some embodiments smart device 100 is similar to and includes components of computing system 1500 described below in FIG. 15. Smart device 100 includes touch sensitive display 102 and back facing camera 124. Smart device 100 also includes front-facing camera 120 and speaker 122. Smart device 100 optionally also includes other sensors, such as microphones, movement/orientation sensors (e.g., one or more accelerometers, gyroscopes, digital compasses, etc.), depth sensors (which are optionally part of camera 120 and/or camera 124), etc.

Figure 2A:
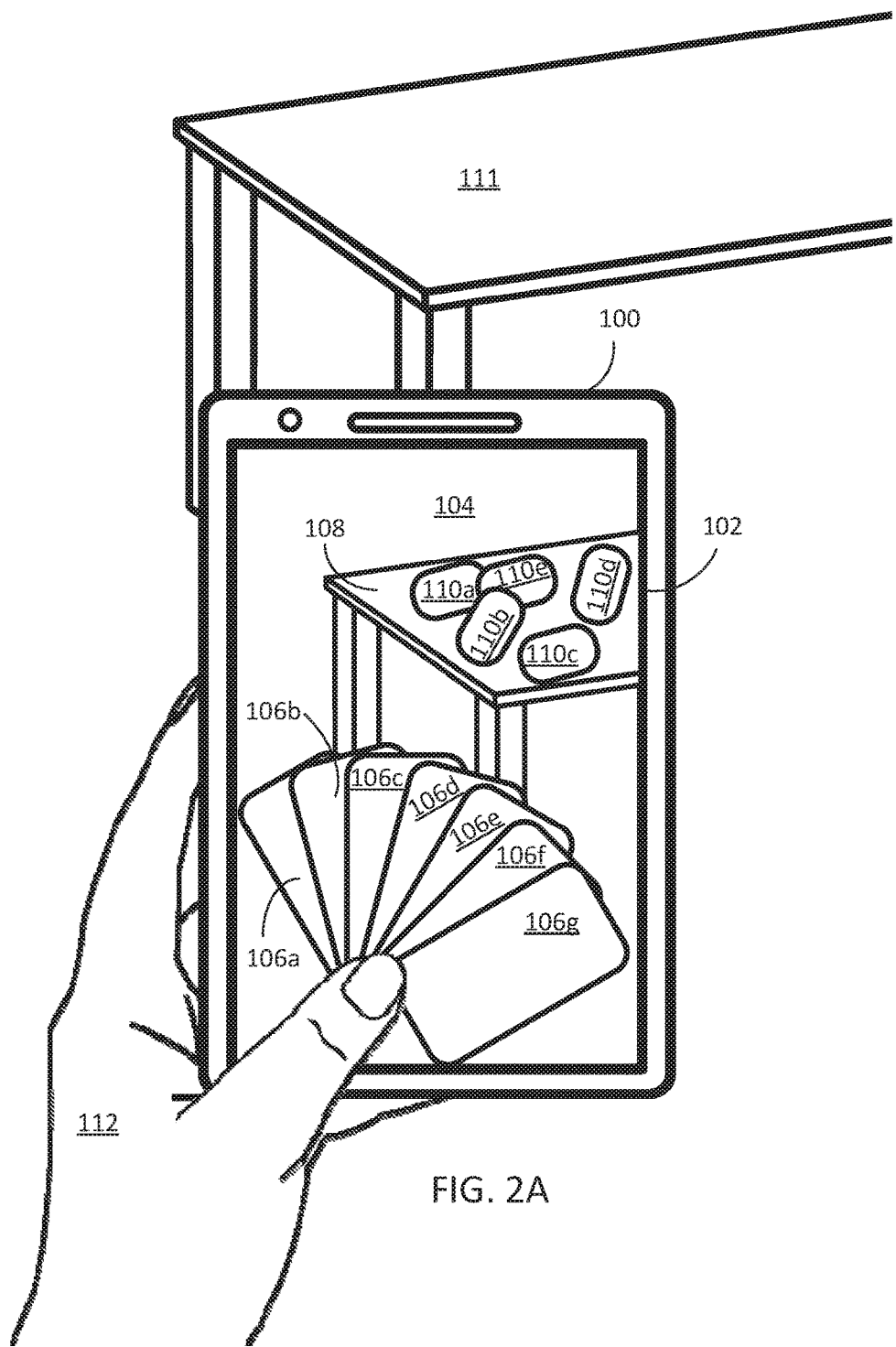
FIGS. 2A-2C depict exemplary user interfaces using some embodiments of the present technology.

In FIG. 2A touch sensitive display 102 is displaying view 104 that includes some of the components defined above. For example, view 104 includes local objects 106a-106g representing a virtual hand of cards, table 108 that is part of the IVAR background (e.g., table 108 corresponds to real table 111 in the physical world and is depicted in view 104 based on image data captured with smart device 100's back-facing camera, such as a live image of the table), and IVAR objects 110a-110e representing a pile of cards on table 108. In FIG. 2A, user hand 112 is holding smart device 100 in a way that mimics holding a hand of cards in the real world. In some cases, cards 106a-106g may be "held" in place when the touch sensitive display 102 detects thumb of user hand 112 is positioned over the cards.

Figure 2B:
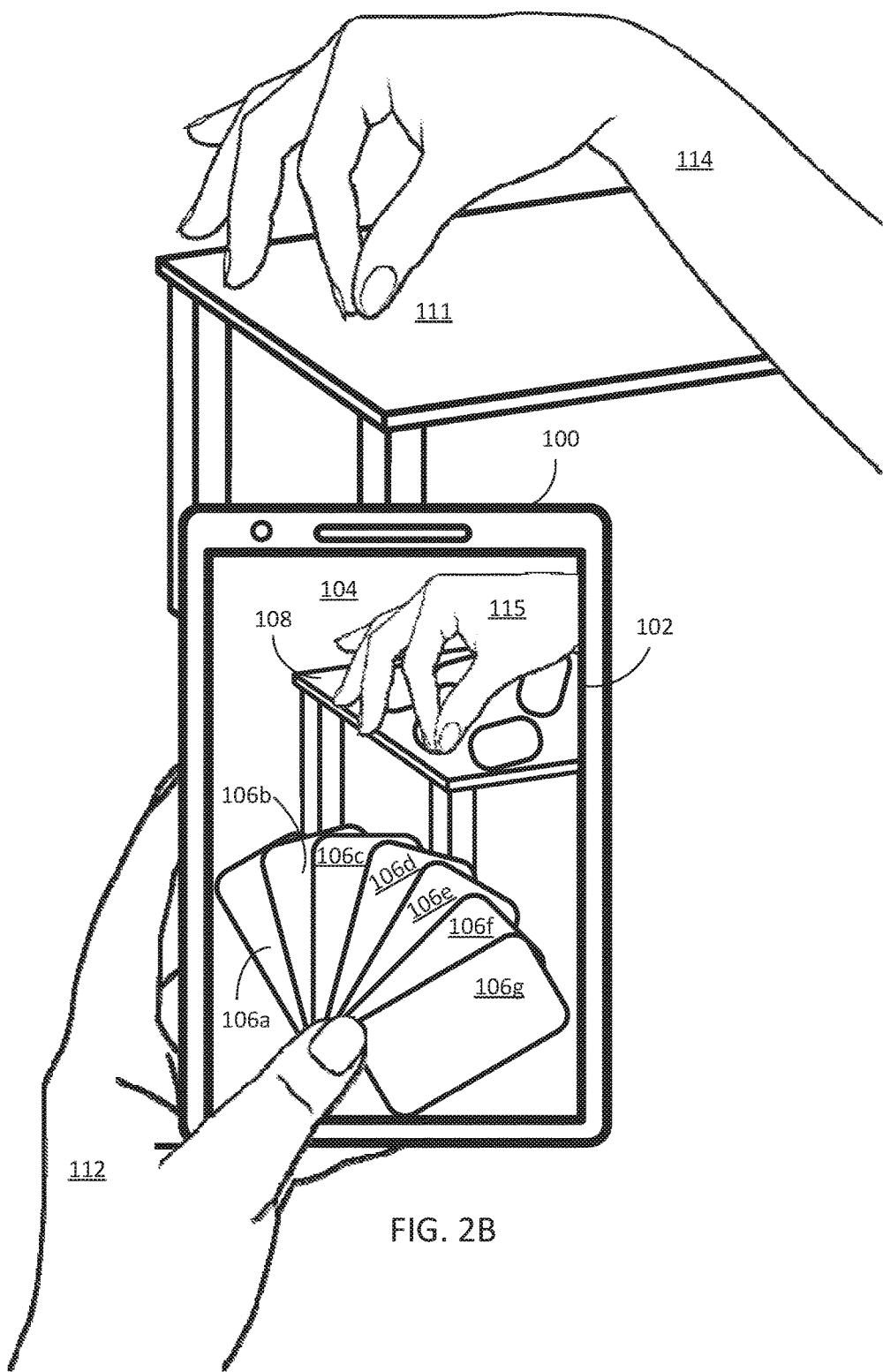

In FIG. 2B, the environment in view 104 is interacted with and updated based on user hand 114 being placed within the field of view of the back-facing camera. View 104 is updated to show user hand 114 relative to IVAR Objects 110a-110e. As user hand 114's position changes with respect to different real or virtual objects (e.g., with respect to smart device 100, with respect to real table 111, or with respect to IVAR Objects 110a-110e, view 104 is updated with new relative positions of user hand 115 (which is user hand 114 being displayed on the screen of smart device 100) and IVAR Objects 110a-110e. By positioning user hand 115 over particular IVAR Objects (e.g., by moving user hand 114 to the location of where object 110b representing a virtual card would be on table 111) and performing an action (e.g., a finger gesture such as pinching fingers on a IVAR Object, holding steady over an IVAR Object, rotating part or all of user hand 114 to identify an IVAR Object, etc.) smart device 100 can recognize the action as a gesture that is interacting with an IVAR Object. In this respect, the IVAR Object is an interface object. In this example, the movements representing the gesture are captured in image data by the back-facing camera and detected by performing image processing and recognition routines on the captured data. FIG. 2B shows an example of how embodiments of the present technology can be used to interact with virtual objects on common smart devices. In effect, display 102 is displaying the AR/VR environment and the back-facing camera allows the user to "reach into" and interact with the environment by performing gestures behind the smart device within the field of view of the back-facing camera.

Figure 2C:
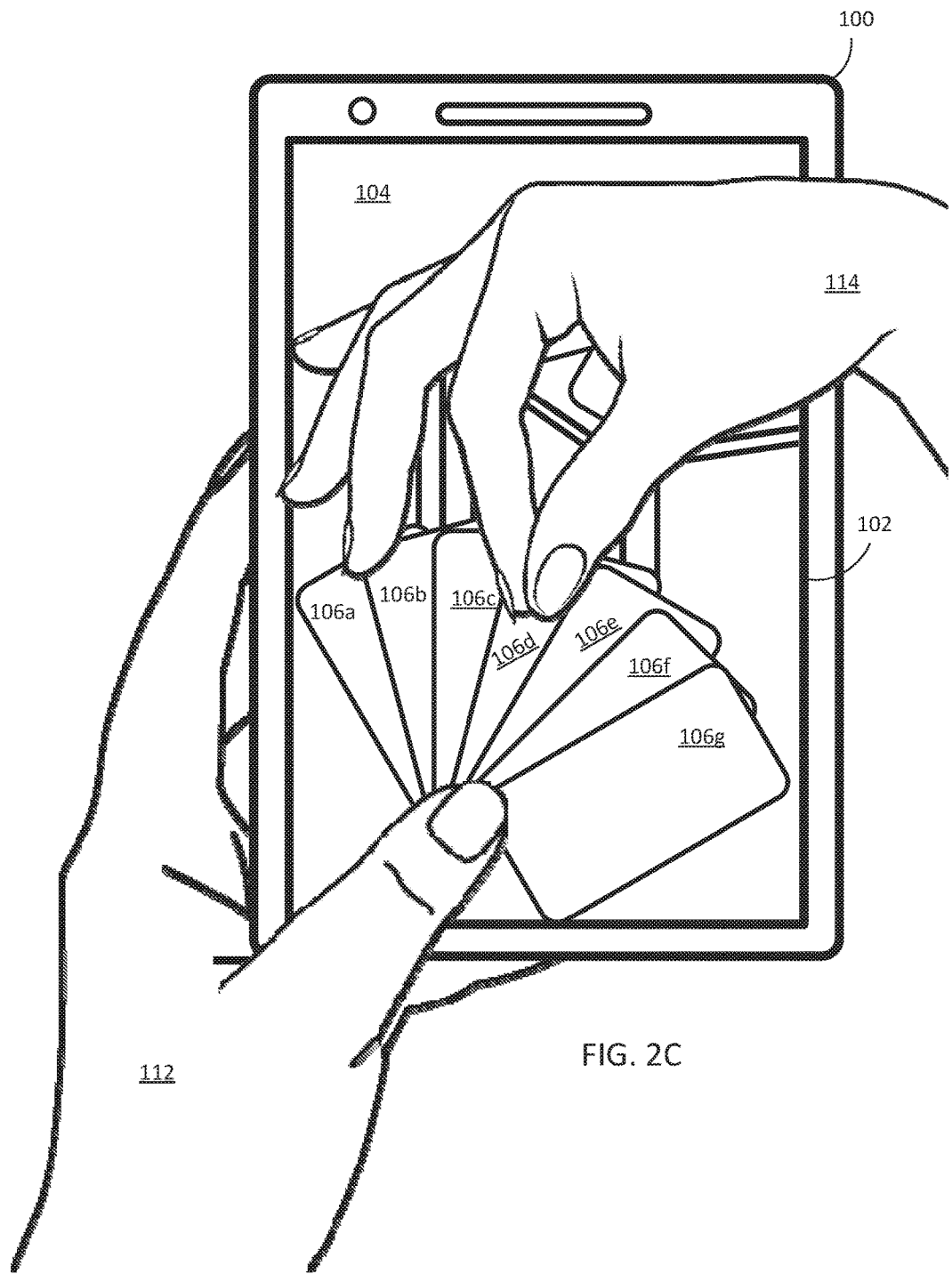

In FIG. 2C, the environment in view 104 is interacted with and updated based on user hand 114 performing a gesture (e.g., a tap, tap and hold, drag, pinch, expand, swipe, etc.) on touch sensitive display 102. For example, if user hand 114 performs a gesture to select one of the Local Objects (e.g., virtual cards), view 104 is updated to show that that object is selected (e.g., the card might move to correspond with movement by user hand 114 or the card might be highlighted). Similar to the previous example, the Local Object in this example is an interface object. In this example, the gesture is captured by touch information touch sensitive display 102 that is further processed to show that user hand 112 touched touch sensitive display 102 in a certain manner.

As explained below, in response to detecting a gesture or multiple gestures linked together, actions and functions can be performed in the IVAR environment. For example, with respect to the example in FIGS. 2B and 2C, virtual cards can be moved between the table and the user's hand based on gesture captured by the back-facing camera and a touch display gesture. The first gesture selects a card (either in the user's hand or on the table) and the second gesture repositions the card. (This same technique could be applied to any number of virtual objects (e.g., interface objects)). In the case of discarding a card, a first gesture is detected by the touch sensitive display when the user's hand touches a particular card and a second gesture is detected based on image data captured from the back-facing camera showing a gesture representing the user dropping the card into the discard pile. In the case of drawing a card, a first gesture is detected based on the captured image data from the back-facing camera showing the user's hand performing a gesture that selects a particular virtual card and the second gesture is detected based on the user's hand touching the touch sensitive display. In each of these cases, two gestures are detected using two different sensors (e.g., a camera and a touch sensor) and a resulting function (e.g., moving a virtual card from one location to another) is performed based on the combination of two gestures. These concepts are described in more detail below with respect to FIGS. 3 and 4.

FIGS. 3A-3C show an example of a first embodiment (e.g. card game). The combination of a touch-screen gesture and a gesture detected by a camera is used to get/send one or multiple cards from/to the IVAR View (emulating the scenario of getting a card from the table/sending a card to the table). Suppose the user is playing a card game, in which the user may send a card to the table or get a card from the table (the "table" here is part of the IVAR View with our terminology). Also, the user may also get a card from the other users in the game who are connected through the Internet. In examples of this embodiment, a touch-screen gesture will be combined with a camera gesture to provide the player a realistic experience in getting and sending cards. The back-facing camera together with the player's touch-screen gesture can determine one of the following scenarios: (1) the player is getting a card from the table; (2) the player is getting a card from another player's hand; or (3) the player is sending a card to the table.

When getting a card from the table, the player moves his hand from a point behind the device (detected by the back-facing camera) toward the screen over the edge of the device, and then use a touch-screen gesture to insert the card(s) into the deck of cards on the device's touch-screen. This is depicted in FIGS. 3A-3C.

When a player is getting a card from another player, he/she will use the technique described below with respect to FIGS. 6A-6C to locate the corresponding player first, and then use the technique described in this embodiment (with respect to getting a card from the table) to "get" the card from that player. For example, instead of the virtual card appearing on a real world table, the virtual card may appear in front of a real world player or a virtual player.

Figure 4C:
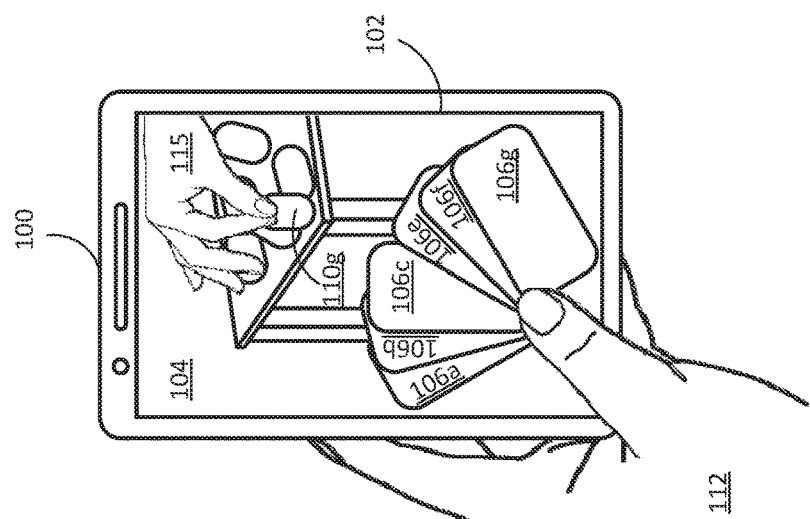
FIGS. 4A-4C depict steps for moving objects between locations in AR and/or VR environments according to some embodiments of the present technology.
Figure 4B:
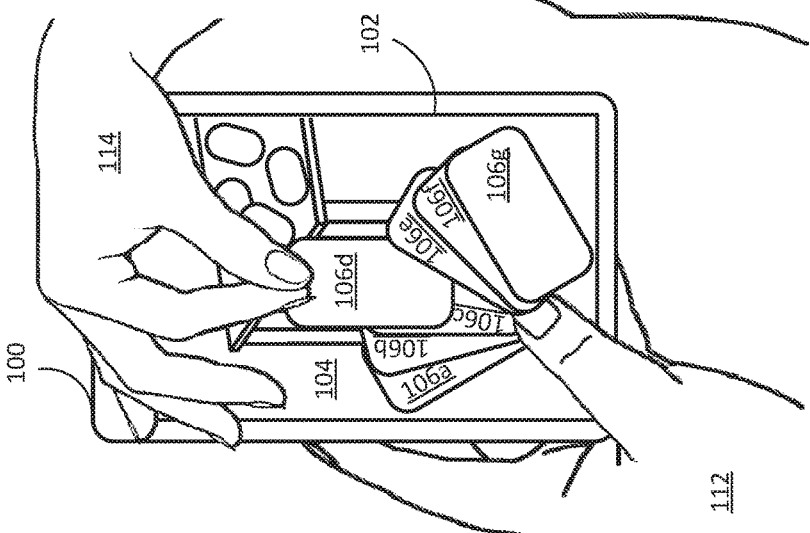
Figure 4A:
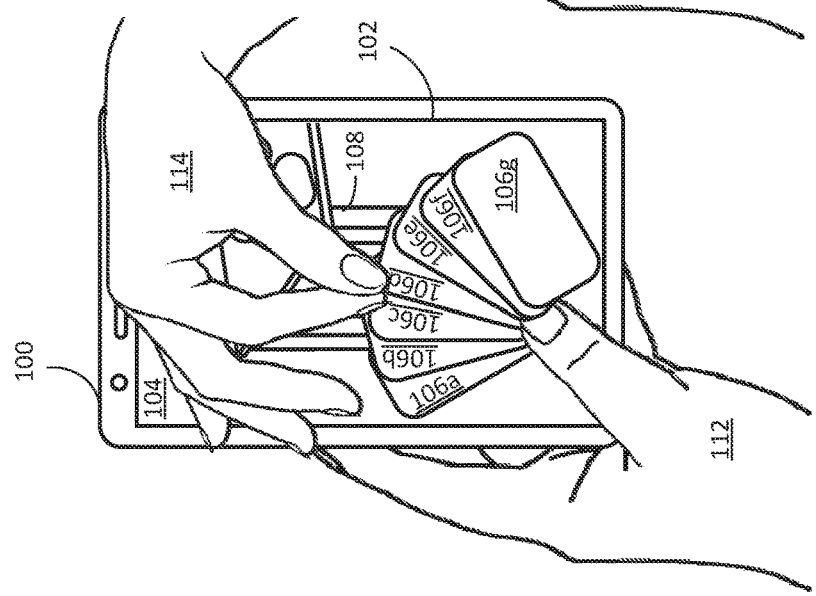

When sending a card to the table, the player selects one or more cards from the deck on his screen using the technique described below and move his fingers beyond the upper edge of the device, and then move his hand to behind the device (i.e. to the IVAR View). By combining the above two movements detected by different sensors, the device determines that the player is sending one or more cards to the IVAR View. This is depicted in FIGS. 4A-4C.

In FIG. 3A, view 104 includes real world objects (user hand 114 and table 108) and virtual objects (IVAR object 110f and Local Objects 106a-106g). The back-facing camera of smart device 100 detects a gesture of user hand 114 (user hand 115 when displayed on the screen) that selects IVAR object 110a (a card on table 108). When IVAR Object 110a is selected, view 104 is optionally updated in various manners to indicate the selection. For example, optionally, the card disappears, changes in appearance, follows movement of user hand 114 (e.g., becomes "attached" to user hand 114), is flipped over, or other effects are applied. After selection, user hand 114 moves from the back of smart device 100 to the front by, for example, moving over smart device 100. In some embodiments this movement is optionally detected by sensors of smart device 100 and registered as a gesture.

In FIG. 3B, after the selection in FIG. 3A, smart device 100 detects another gesture from user hand 114. Specifically, the gesture (e.g., a two finger touch and drag down) is detected on touch sensitive display 102. This gesture causes view 104 to be updated to show that Local Object 106h (which corresponds to IVAR Object 110a (FIG. 3A) is being placed within Local Objects 106a-106g. The placement of the object is change by movement of user hand 114 on touch sensitive display 102.

In FIG. 3C, the exact placement of Local Object 106h is based on the placement of user hand 114 when an additional portion of the gesture (or a new gesture) is detected. For example, Local Object 106h's location is optionally set when user hand 114 breaks contact with touch sensitive display 102 (e.g., or with a de-pinch or expand gesture). Thus, in response to the motions depicted in FIGS. 3A-3C, interface objects (e.g., a card from the table) are moved within the view.

In FIG. 4A, view 104 includes a real world object (table 108) and virtual objects (Local Objects 106a-106g and 106i). Touch sensitive display 102 detects a gesture (e.g., a two finger touch and drag up) of user hand 114 that selects Local Object 106d (a card in the user's hand). When Local Object 106d is selected, view 104 is updated in various optional manners to indicate the selection. For example, optionally, the card disappears, changes in appearance, follows movement of user hand 114 (e.g., becomes "attached" to user hand 114 as shown in FIG. 3B), is flipped over, or other effects are applied. After selection, user hand 114 moves from the front of smart device 100 to the back by, for example, moving over smart device 100. In some embodiments this movement is optionally detected by sensors of smart device 100 and registered as a gesture.

In FIG. 4C, view 104 is updated to remove Local Object 106d and to show IVAR Object 110g (which is associated with Local Object 106d). A gesture of user hand 114 is detected by the back-facing camera (e.g., by capturing image data showing the hand movements and transmitting the data to a processor for analysis). Based on the movement and positioning of the gesture, IVAR Object 110g is moved in view 104. The position of IVAR Object 110g is set, for example, in response to another portion of the gesture (or a new gesture all together). For example, a two-finger de-pinching or expanding gesture releases object 110g on to table 108.

While the examples in FIGS. 1-4 show embodiments of the current technology that rely on touch gestures and gestures detected by cameras, this is not necessary. Gestures can be detected by any number of sensors and techniques. Additionally, the embodiments of the present technology can rely on any combinations of different sensor, whether or not they are the same type of sensor. In some cases the gestures are performed by different parts of a user. For example, gestures can be performed by any combination of device movement, hand/arm movement, head movement, facial expressions, whole body movement, etc.

For example, in another embodiment, gestures from front-facing and back-facing cameras are used. Below, the idea of blowing a kiss is used as an exemplary application, but many other applications may use the same or similar concepts. The first gesture is based on a facial expression and the second gesture is based on a hand positioning. Some examples of this embodiment can be seen as an extension from the embodiments described with respect to FIGS. 1-4. In other words, the IVAR technology can be extended to combine gestures from the front-facing camera, the back-facing camera, touch-screen, the accelerometer, and/or other sensors to produce more IVAR effects and/or options for the user to experience. Other actions, such as sending/receiving information, other interactions with interface objects besides relocating the objects, selecting/deselecting objects, etc., are possible using the techniques described above.

For example, the IVAR gesture can perform an action by using one or more gestures from both of the front- and back-facing cameras (or other combinations of sensors). In one case, a user can perform a blow kiss captured by a front-facing camera together with a hand gesture (e.g., an extended palm or waving) captured by back-facing camera, and her boyfriend from another side of the world will see a kiss "coming-out" from his phone (i.e., from his IVAR View). This example is depicted in FIG. 5.

Figure 5A:
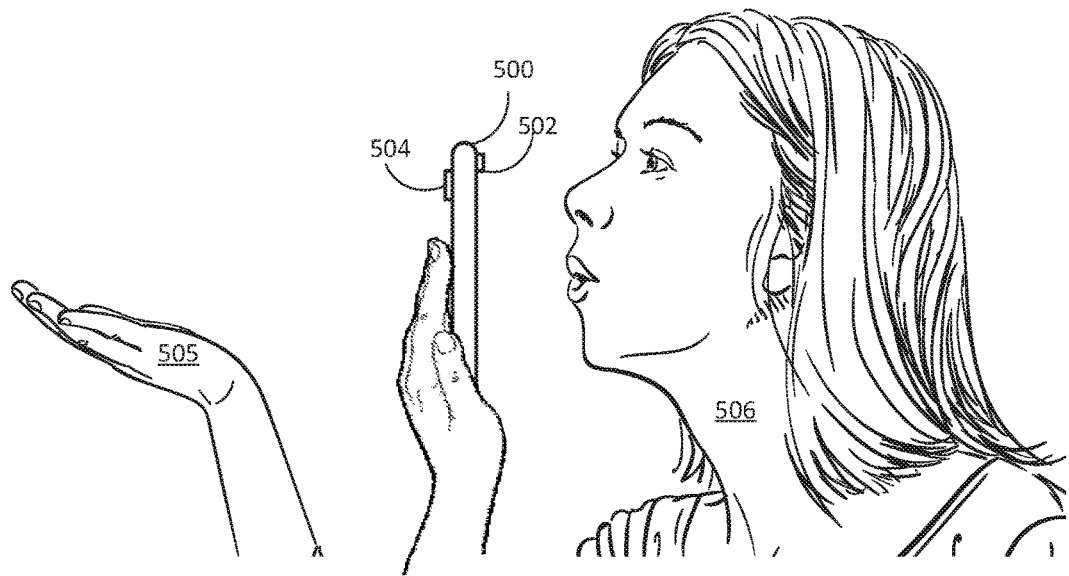
FIGS. 5A-5B depict steps for generating AR and/or VR messages according to some embodiments of the present technology.
Figure 5B:
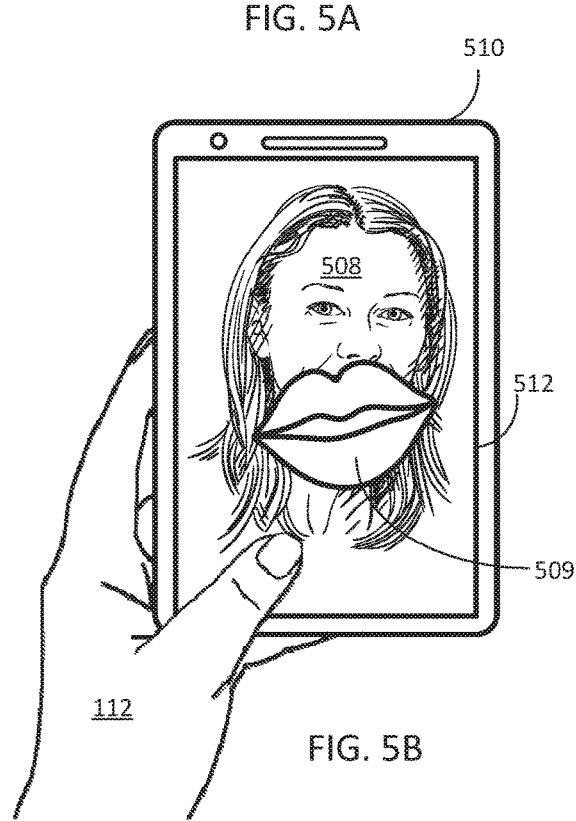

FIGS. 5A-5B illustrate an example of how to combine the front- and back-facing cameras to produce an IVAR operation. In FIG. 5A, device 500 (which includes front-facing camera 502 and back-facing camera 504) is held by user 506 (i.e., the sender). When device 500 determines that (1) a blowing gesture (e.g., a puckering of the lips of user 506 and/or a blowing sound) is detected by front-facing camera 502 (and/or other sensors, such as a microphone) and (2) a hand gesture (e.g., a horizontal positioning of hand 505 or a waving of hand 505) is detected by back-facing camera 504, device 500 sends a blow kiss to a remote user. The remote user receives an IVAR blow kiss coming out from his screen such as depicted in FIG. 5B with device 510 showing kiss 509 on display 512 optionally coming from real life image 508 (or computer generated image) of user 506. In contrast to the example described above with respect to FIGS. 1-4 where the first and second gesture may be linked together by common movement of a user's hand that is performing both gestures, in the blow kiss example, the gestures are performed by different parts of the user's body and are linked together by the fact that the gestures occur contemporaneously. Determining whether two gestures are contemporaneous or whether gestures are performed by a continuation of the same movement are example techniques that the smart device may use to determine whether gestures are linked together. This determination may be a part of any of the techniques of the present technology that rely on detecting two or more gestures.

In an example of another aspect of some embodiments of the present technology, an application (e.g. card game or video conference) uses the accelerometer, gyroscope, or other sensors, are used to identify different IVAR Views. For example, based on the combination of accelerometer/gyroscope data (or other sensor data) and IVAR technology, each user in a multiple-player game or video conference can locate other connected users according to the angle of where his/her device is pointing to. For example, in a 4-player card game, the "first" user can locate the second user by pointing his/her device to, for example, 60 degrees (or about 60 degrees) toward left (e.g., see FIG. 6A); can locate the third user by, for example, pointing his/her device straight forward (e.g., see FIG. 6B); or can locate the fourth user by, for example, pointing his/her device to 60 degree (or about 60 degrees) toward right (e.g., see FIG. 6C). Also, when one of the users is located, his/her real-time selfie-video (taken from the corresponding player's front-facing camera) will be shown on the screen of the first player. While 60 degrees is used as an example above, any rotation threshold or other rotation criteria (e.g., change thresholds, rotational ranges, holding a rotation for an amount of time, a combination of any of these, etc.) maybe used to switch the focus (e.g., change view) to different remote user (e.g., players of the game).

Figure 6C:
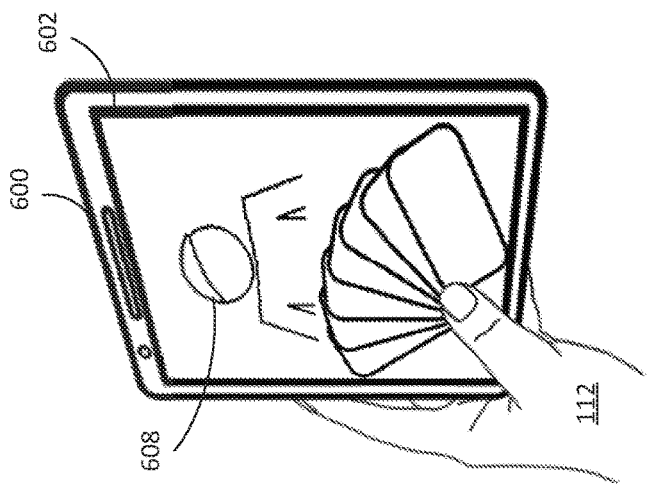
FIGS. 6A-6C depict examples of navigating between remote users in AR and/or VR environments environment.
Figure 6B:
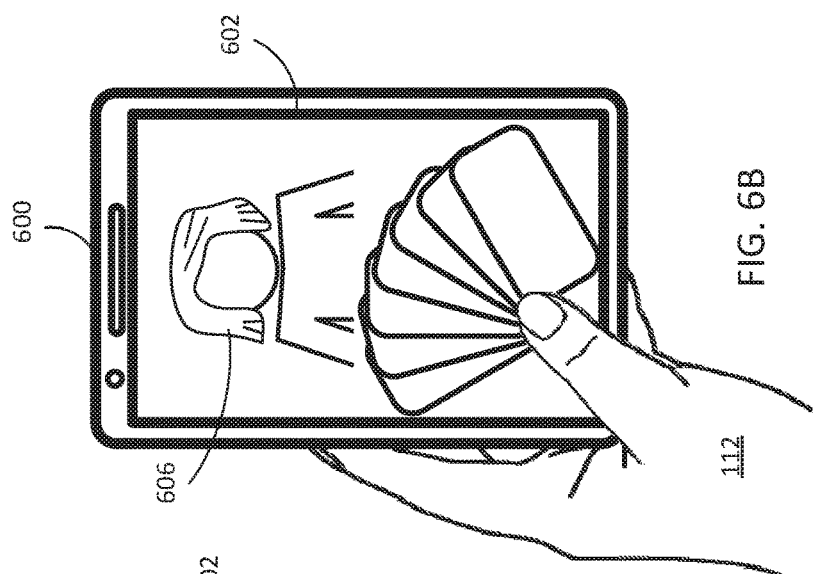
Figure 6A:
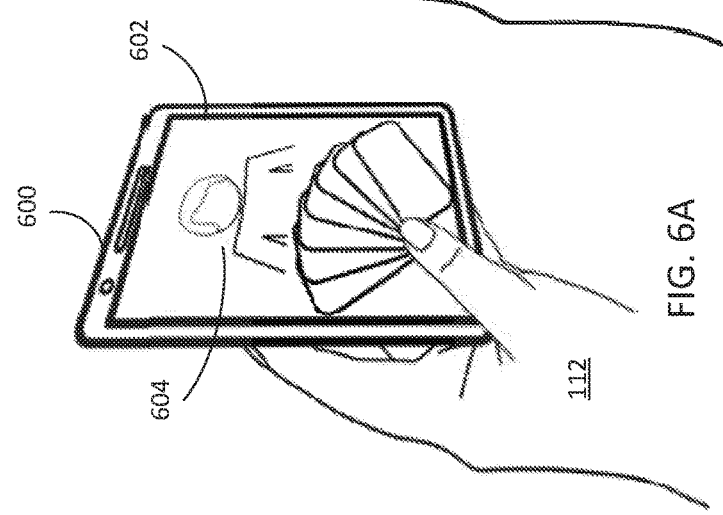

In FIG. 6A, smart device 600 detects, via accelerometer, gyroscope, and/or digital compass data, that the user is pointing smart device 600 60 degrees (or about 60 degrees) to the left. In response, smart device 600 displays on display 602 video feed 604 that is associated with a second user (e.g., a live video feed or a computer generated video feed). A range of rotation (e.g., about 80 to 40 degrees) may be assigned to the second user. If smart device 600 detects a rotation in this range, the video feed for the second user is displayed. Additionally, smart device 600 can make other adjustments to its operation based on the orientation. For example, if the user of smart device 600 is playing a card game, interactions (e.g., receiving or sending cards) optionally are automatically associated with the second user. For example, smart device 600 can send data to a particular address associated with the second user, can send data identifying the second user along with other data (e.g., the card that is being sent), or be setup so that any communication that takes place occurs with respect to the second user.

In FIG. 6B, smart device 600 detects, via accelerometer, gyroscope, and/or digital compass data, that the user is pointing smart device 600 straight ahead (e.g., 0 degrees or about 0 degrees). In response, smart device 600 displays on display 602 video feed 606 that is associated with a third user (e.g., a live video feed or a computer generated video feed). A range of rotation (e.g., about 20 to −20 degrees) may be assigned to the third user. If smart device 600 detects a rotation in this range, the video feed for the third user is displayed. Additionally, smart device 600 can make other adjustments to its operation based on the orientation. For example, if the user of smart device 600 is playing a card game, interactions (e.g., receiving or sending cards) optionally are automatically associated with the third user. For example, smart device 600 can send data to a particular address associated with the third user, can send data identifying the third user along with other data (e.g., the card that is being sent), or be setup so that any communication that takes place occurs with respect to the third user.

In FIG. 6C, smart device 600 detects, via accelerometer, gyroscope, and/or digital compass data, that the user is pointing smart device 600 60 degrees (or about 60 degrees) to the right (i.e., −60 degrees). In response, smart device 600 displays on display 602 video feed 608 that is associated with a fourth user (e.g., a live video feed or a computer generated video feed). A range of rotation (e.g., −40 to −80 degrees) may be assigned to the fourth user. If smart device 600 detects a rotation in this range, the video feed for the fourth user is displayed. Other rotation and/or orientation criteria can also be used. Additionally, smart device 600 can make other adjustments to its operation. For example, if the user of smart device 600 is playing a card game, interactions (e.g., receiving or sending cards) optionally are automatically associated with the fourth user. For example, smart device 600 can send data to a particular address associated with the fourth user, can send data identifying the fourth user along with other data (e.g., the card that is being sent), or be setup so that any communication that takes place occurs with respect to the fourth user. The technique described in FIGS. 6A-6C can be used, for example, to take or pass cards to other remote users when playing cards and using the techniques described above with respect to FIGS. 1-4.

In a variation of some embodiments of the present technology, VR environments (or other environments) are interacted with using gestures. For example, if a VR view is displayed on a device, the VR view may be interacted with by the device detecting a user's hand or other object behind the device.

FIGS. 7A-7C depict an example of this concept. A site visit application (which is often used in the real estate industry, as an example) on device 700 is displayed on display 702. Device 700 includes a back-facing camera. In FIG. 7A a user is viewing a real estate using the application. The user is looking at a wall with virtual switch 704 (which can be a real image of a real switch or a computer generated switch). In FIG. 7B, using a gesture detected by the back-facing camera, the user interacts with virtual switch 704. For example, by making a pressing gesture that is detectable by the back-facing camera, for example using depth information, (or other sensors, such as a depth sensor) the user can turn the switch on or off, as depicted in FIG. 7C.

FIGS. 8-12 depict variations and other features that can optionally be applied to embodiments described above.

Figure 8:
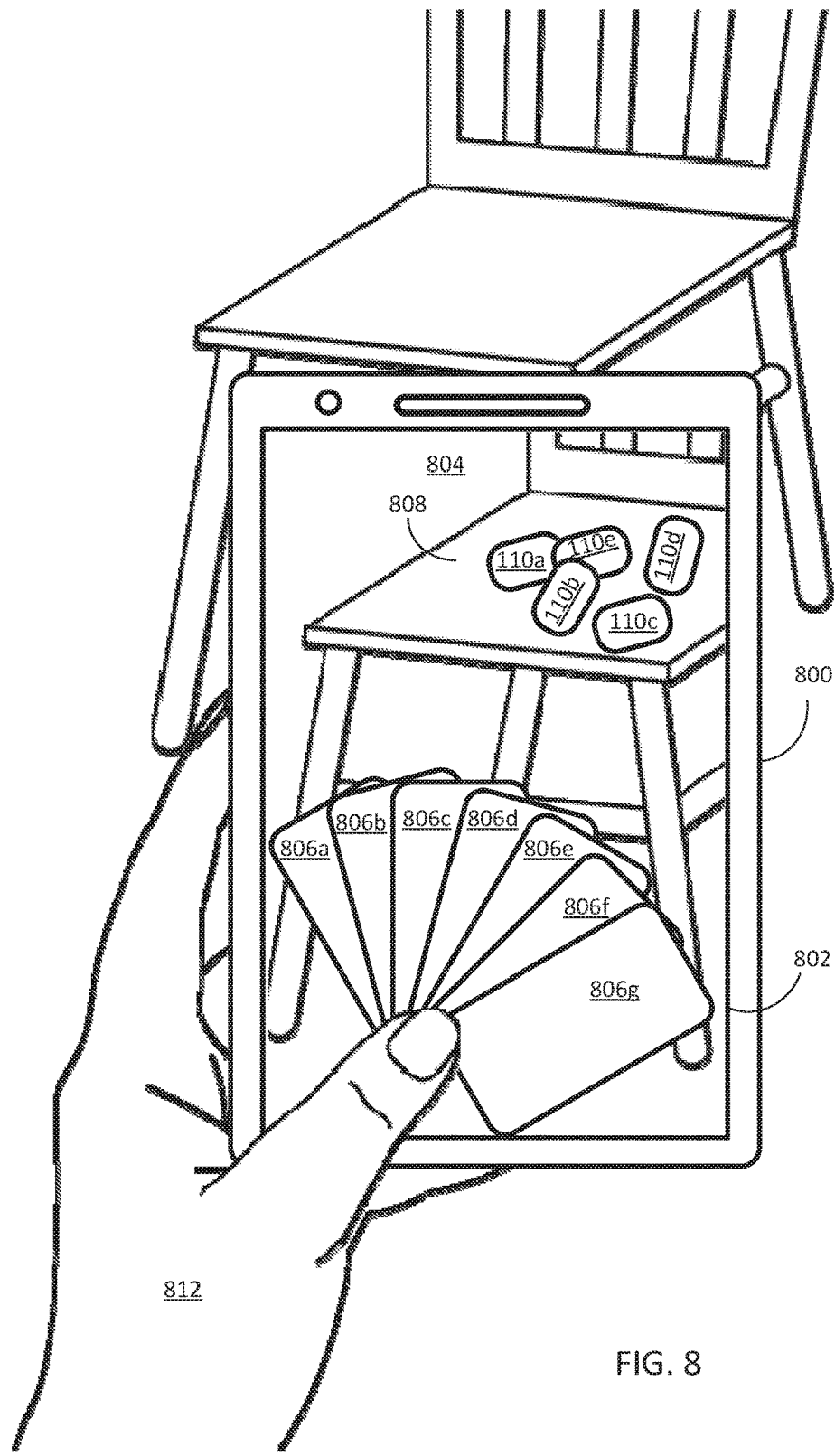
FIG. 8 depicts an example of a remote user's interface according to some embodiments of the present technology.
Figure 9:
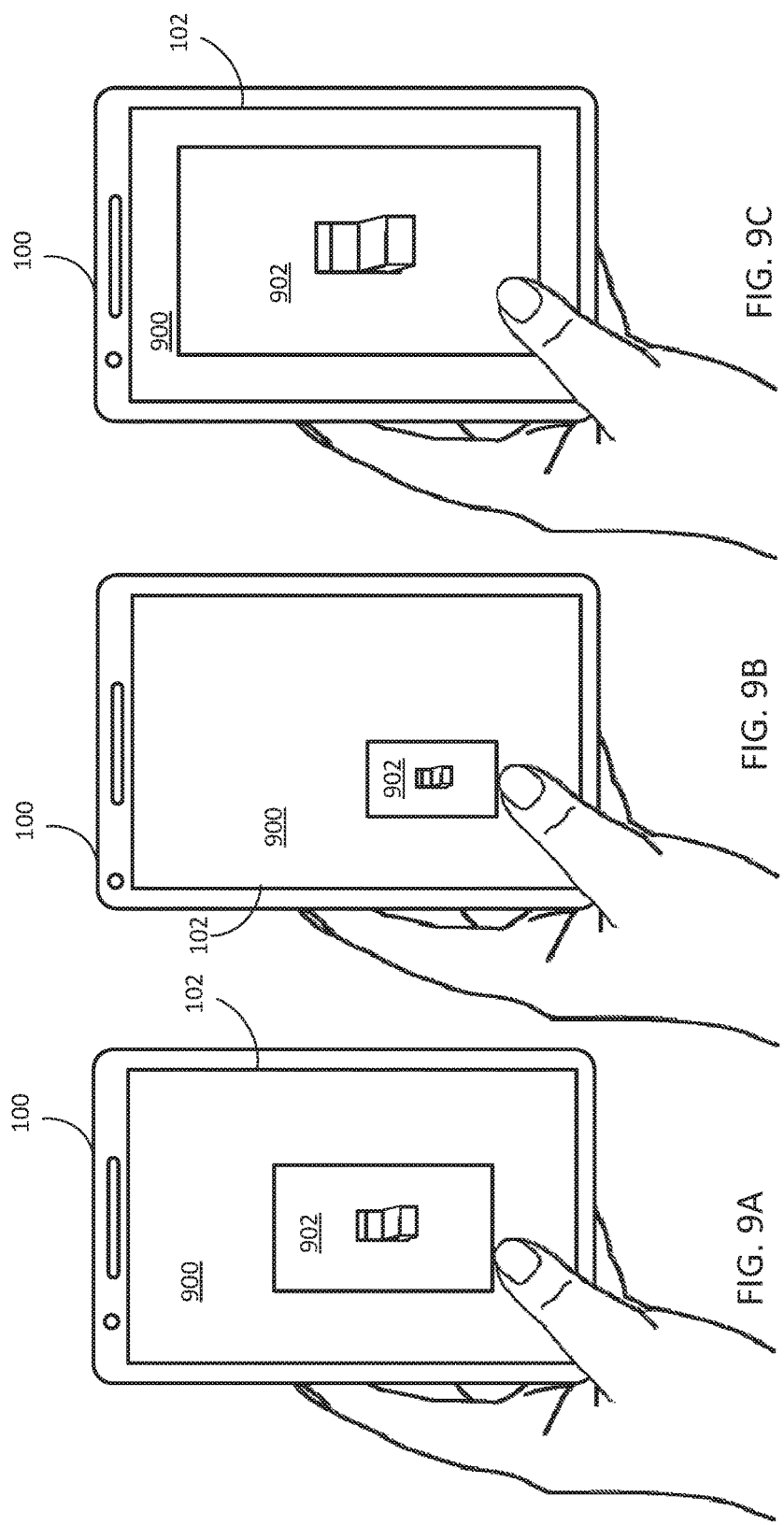
FIGS. 9A-9C depict examples of interacting with AR and/or VR environments according to some embodiments of the present technology.

In FIG. 8, in a card game using IVAR View technology, all the players can see the real-time card status (including the locations and arrangement of the cards on the IVAR View). In other words, when one player sends a card to the IVAR View (e.g., by removing a card from his/her hand and placing it on the discard pile, as described with respect to FIGS. 1-4), all the players in the game will see this card in real-time. For example, in FIG. 8, if the user were to use the techniques described above to play a card game with the user of device 100 in FIG. 1, the user hold device 800 with user hand 812 would see the same pile of cards (represented by IVAR Objects 110a-110e). Specifically, in FIG. 1 touch sensitive display 802 is displaying view 804 that includes local objects 806a-806g representing a virtual hand of cards, chair 808 that is part of the IVAR background (e.g., chair 808 is a real chair in the physical world and is depicted in view 804 based on image data captured with smart device 800's back-facing camera), and IVAR objects 110a-110e representing a pile of cards on chair 808, which are the same pile of cars represented as being on table 108 in view 104 of FIG. 1. In FIG. 8, user hand 812 is holding smart device 800 in a way that mimics holding a hand of cards in the real world. In some cases, cards 806a-806g may be "held" in place by the thumb of user hand 812

FIGS. 9A-9C illustrates an example where an IVAR object is magnified or shrunk using hand gestures and/or motion and position sensor data. In FIG. 9A, smart device 100 with display 102 is displaying view 900 with IVAR object 902. Smart device 100 is being held by user hand 112. In FIG. 9B, user hand 112 has tilted device 100 towards the user. In response to detecting the tilt using one or more sensors (e.g., accelerometer, gyroscope, digital compass, etc.), smart device 100 has enlarged or magnified a portion of view 900 so that IVAR object 902 is now larger. In contrast, n FIG. 9C, user hand 112 has tilted device 100 away from the user. In response to detecting the tilt using one or more sensors (e.g., accelerometer, gyroscope, digital compass, etc.), smart device 100 has shrunk or de-magnified a portion of view 900 so that IVAR object 902 is now smaller. This technique can be used to interact with and maneuver in IVAR environments and applications, such as the ones described above.

Figure 10:
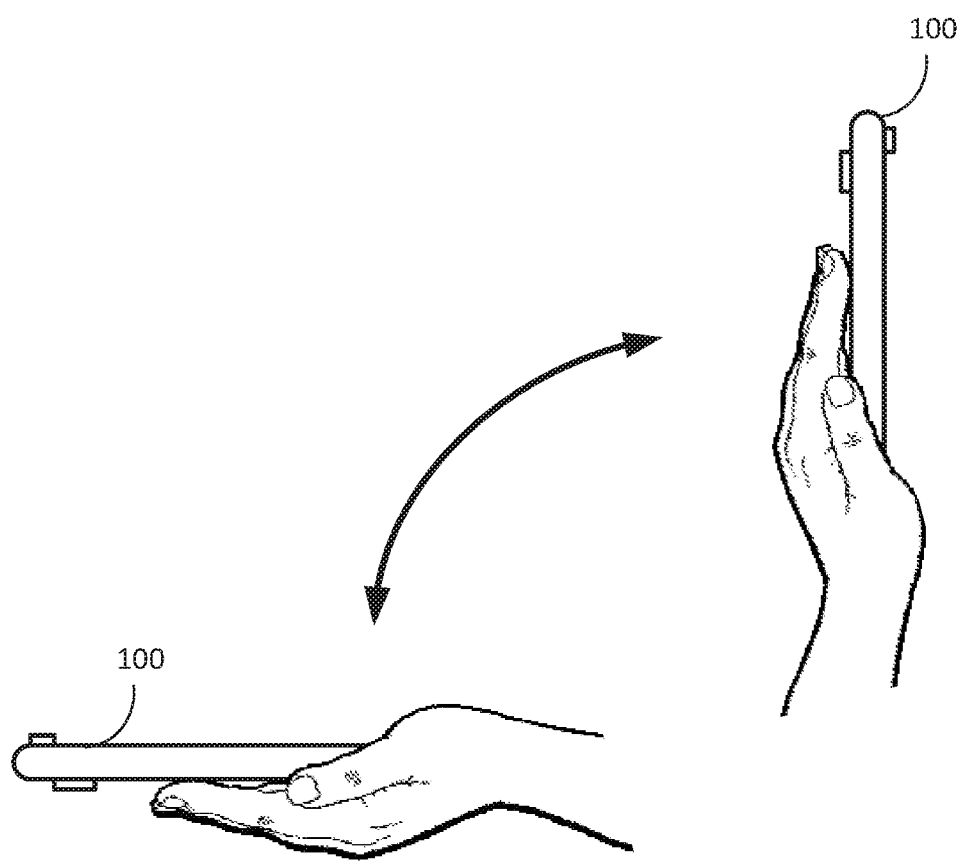
FIG. 10 depicts an example of interacting with AR and/or VR environments according to some embodiments of the present technology.
Figure 11:
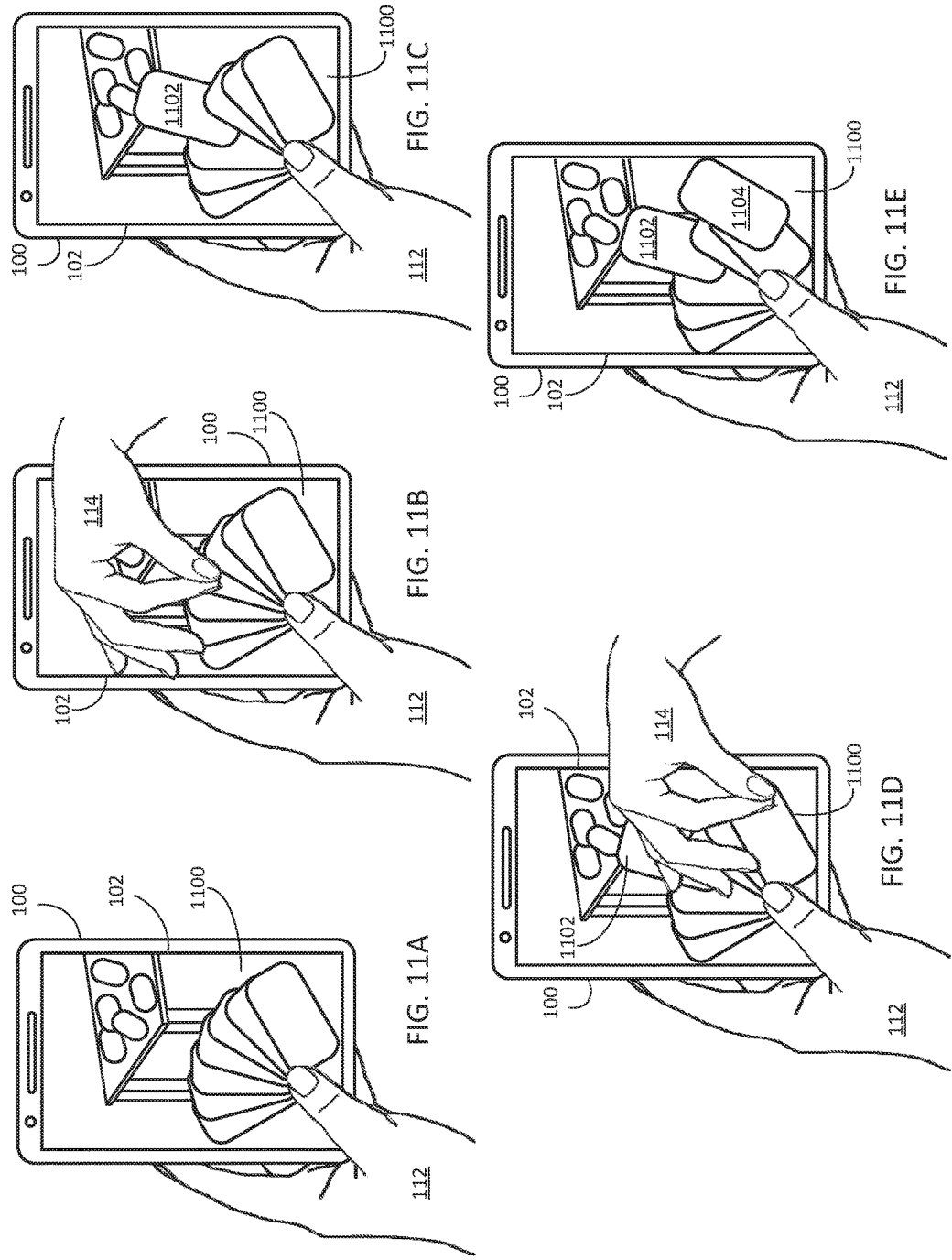
FIGS. 11A-11E depict examples of rearranging objects in AR and/or VR environments according to some embodiments of the present technology.
Figure 12:
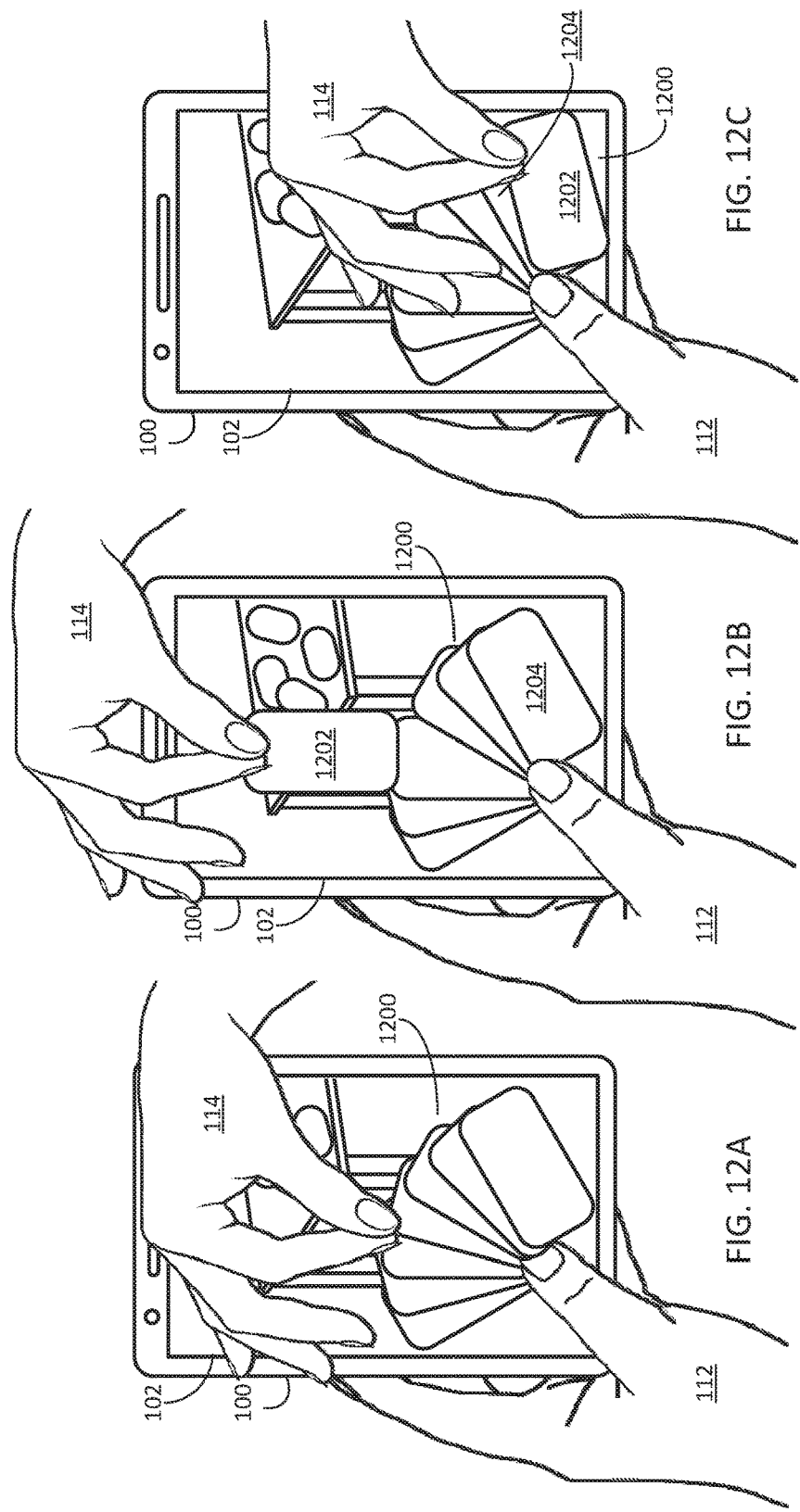
FIGS. 12A-12C depict examples of rearranging objects in AR and/or VR environments according to some embodiments of the present technology.

In FIG. 10, a gesture is depicted that can be used to reveal what might otherwise be private information displayed on a user's smart device. Specifically, in FIG. 10, when sensors of smart device 100 detect that smart device 100 has been reoriented from a vertical orientation to a horizontal orientation, smart device 100 may send information to one or more users in response. For example, in the card playing example above in FIGS. 1-4, in response to smart device 100 detecting a change in orientation (such as, but not limited to, the orientation change depicted in FIG. 10), smart device 100 may send to and/or cause to be displayed on remote user's device the cards that the user of smart device 100 was holding in his/her hand. The information may be broadcast to all other connected users to only to designated users (e.g., using the selection method described with respect to FIG. 6). While FIG. 10 depicts a change from vertical to horizontal orientations, other changes can also be used to trigger this result. For example, an orientation change of a certain threshold (e.g., a change of at least 60 degrees) may be used. As another example, reaching an orientation threshold (e.g., an orientation of 20 degrees or less (with 0 degrees being horizontal) or orientation range (reaching and remaining in a range from 0-15 degrees) or other orientation criteria may be used to trigger this effect.

FIG. 11A depicts smart device 100 displaying on touch sensitive display 102 hand of cards 1100 in an environment similar to the description above for FIGS. 1-4. When a card is selected using a gesture, such as the two-finger touch and drag depicted in FIG. 11B, card 1102 sticks out and remains sticking out even when the gesture ends, as depicted in FIG. 11C. This technique is depicted in FIGS. 11D and 11E as well with respect to card 1104. Other users may see the back of the user's hand and that two cards are sticking out.

FIG. 12A-12C illustrate an example of a player rearranging the card deck on the touch-screen using the techniques described above. FIG. 12A depicts smart device 100 displaying on touch sensitive display 102 hand of cards 1200 in an environment similar to the description above for FIGS. 1-4. When a card is selected using a gesture, such as the two-finger touch and drag depicted in FIG. 12B, card 1202 is selected. As user hand 114 moves across display 102, card 1202 follows hand 114 so that the user can position card 1202 in a new location (in this case, next to card 1204). The gesture then continues by dragging the two fingers down into the location in cards 1200 to locate card 1202 in that location, as depicted in FIG. 12C.

Figure 13:
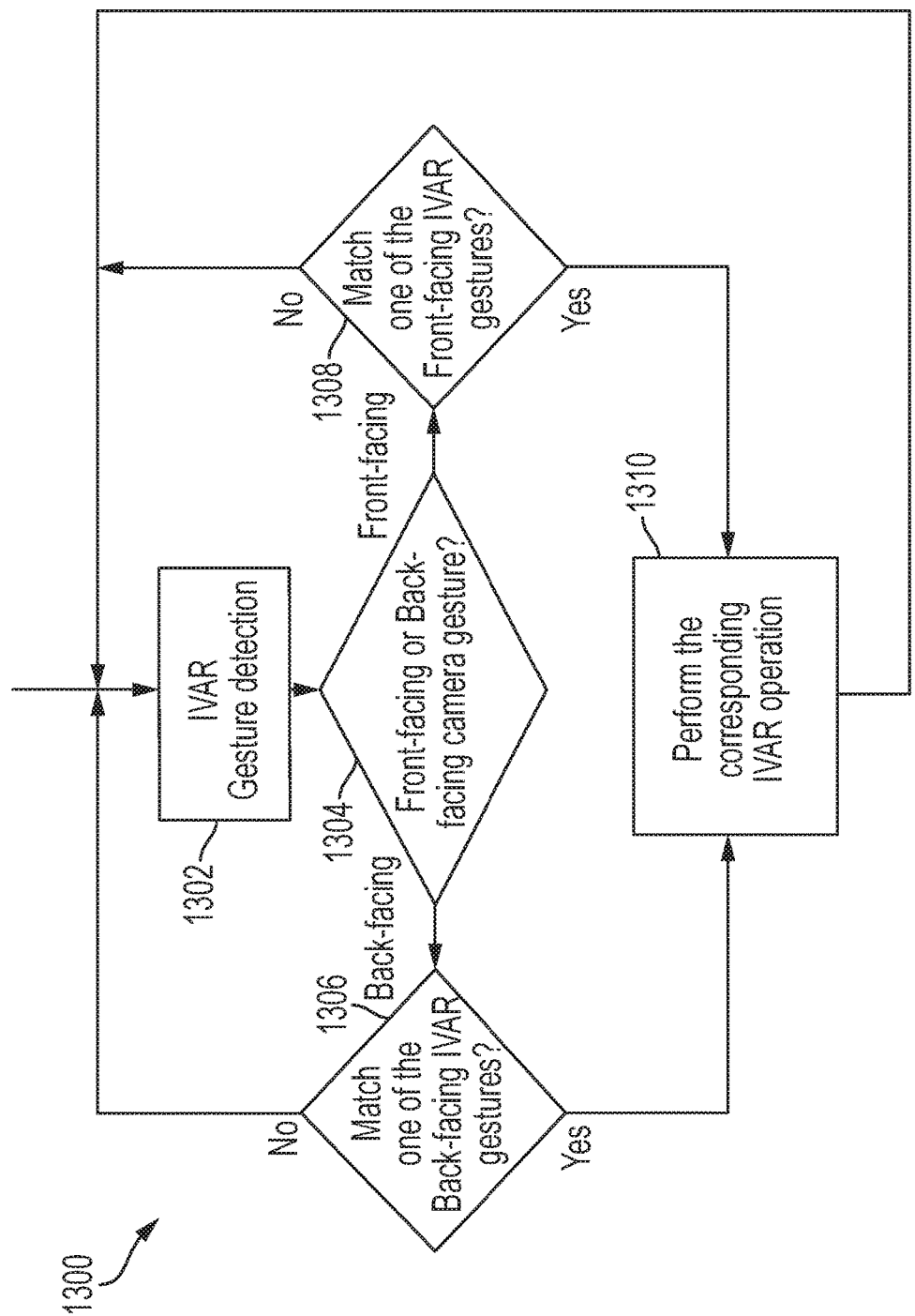
FIG. 13 is a flow chart of a process for interacting with AR and/or VR environments.

FIG. 13 depicts process 1300 for performing gestures based on captured image data. In some example, the capture image data include at least visible, infrared, and/or ultra violet light data. Additionally, in some examples, the captured image data include depth information. At step 1302, image data is captured from one or more image sensors. At step 1304, a determination is made as to whether the image data is from the front- or back-facing camera. If the image data is from the back-facing camera, then in step 1306 a determination is made as to whether the captured image data corresponds to one or more gestures. If the image data is from the front-facing camera, then in step 1308 a determination is made as to whether the captured image data corresponds to one or more gestures. If the captured image data does not correspond to one or more gestures, then the process returns to capturing image data. On the other hand, if the capture image data corresponds to a gesture, then in step 1310, a corresponding operation is performed. The corresponding operation can be any number of functions, actions, etc. For example, in step 1310 a process can determine whether another gesture was performed before, after, or during the present gesture. Taking the process described with respect to FIGS. 5A-5B as an example, in step 1310, it can be verified that both the blowing gesture and the hand gesture were both performed. In response, process 1300 can cause data to be sent that causes the kiss to be displayed on a remote user's device.

Figure 14:
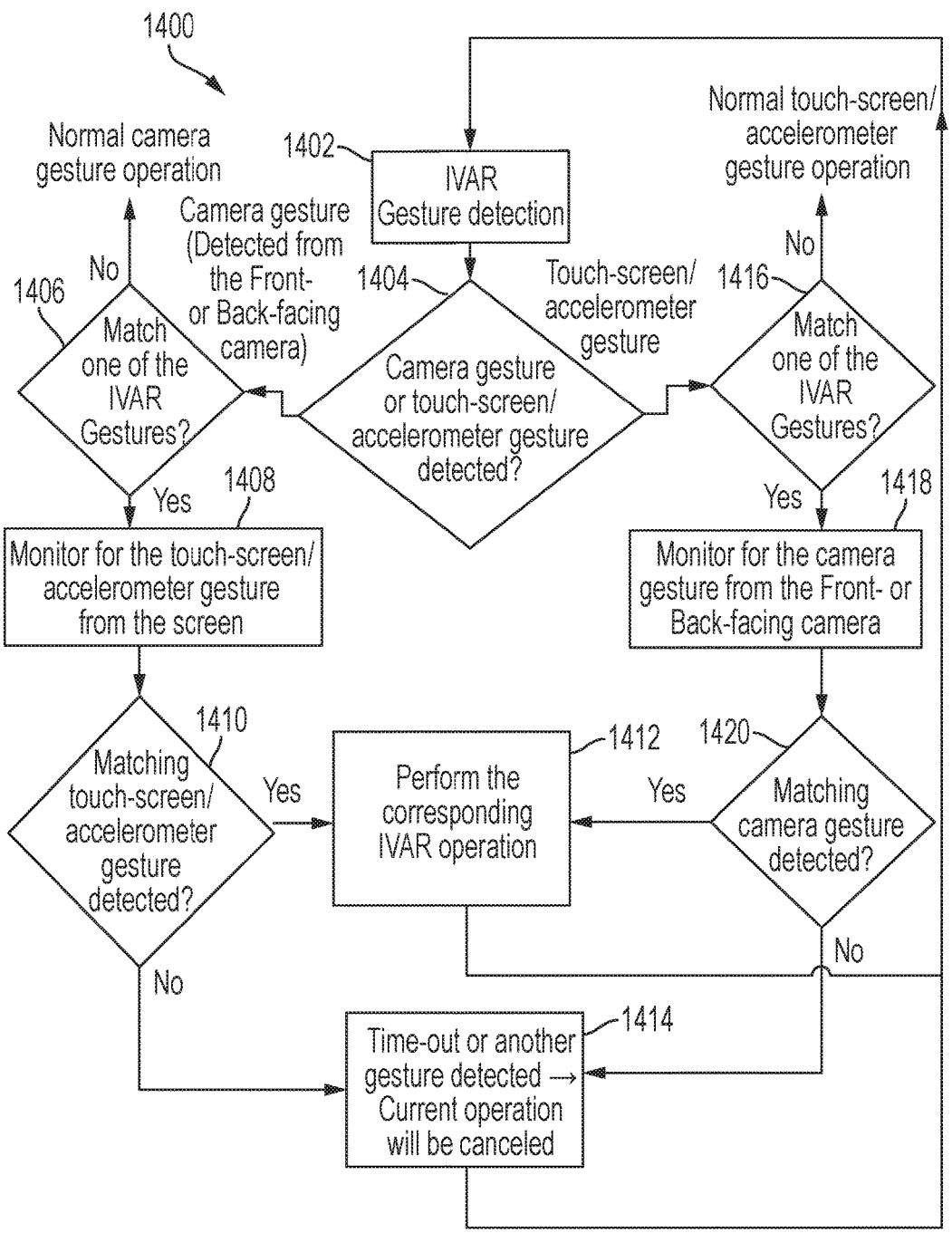
FIG. 14 is a flow chart of a process for interacting with AR and/or VR environments.

FIG. 14 depicts process 1400 for detecting multiple gestures that interact with a IVAR environment. In step 1402, sensor data from a plurality of sensors is obtained. In the case of process 1400 that is directed to camera and touch-screen or accelerometer gestures, a determination is made at step 1404 of whether the sensor data is camera data or touch-screen/accelerometer data. If the data is camera data, at step 1406, it is determined whether the data matches a gesture (e.g., by using process 1300 described above). If not, the process starts over. If there is a match, additional sensor data is captured in step 1408 from a different sensor (e.g., the touch-screen, accelerometer, or other sensor). In step 1410, the additional sensor data is analyzed to determine whether it is a matching gesture. If it is, in step 1412, an IVAR operation is performed, such as interacting with a IVAR environment by moving an object or sending data. If the additional sensor data is not received or not a gesture, then in step 1414, the current process is canceled and it starts over. In step 1404, if the sensor data is touch-screen or accelerometer (or other data), in steps 1416, 1418, and 1420 similar analysis and capture of additional data is performed as described with respect to steps 1406, 1408, and 1410 except the additional sensor data is camera data.

Figure 15:
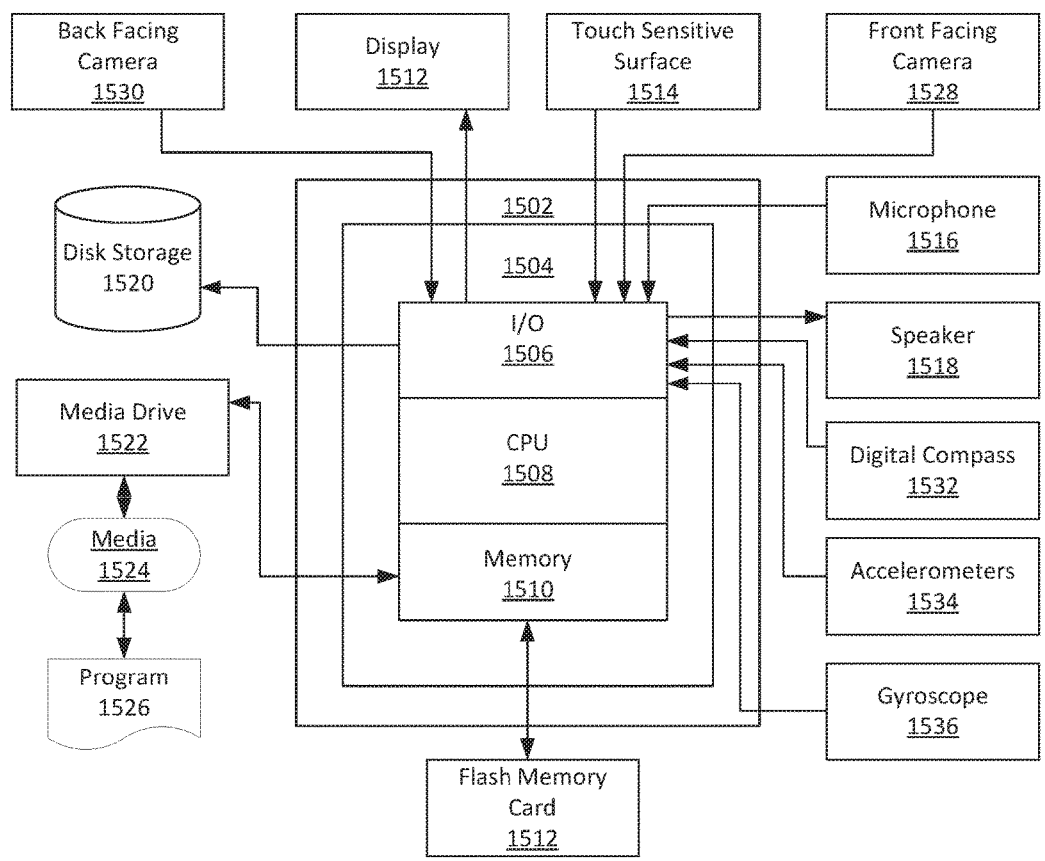
FIG. 15 is a block diagram of an electronic device that can implement some embodiments of the present technology.

Turning now to FIG. 15, components of an exemplary computing system 1500, configured to perform any of the above-described processes and/or operations are depicted. For example, computing system 1500 may be used to implement smart device 100 described above that implements any combination of the above embodiments. Computing system 1500 may include, for example, a processor, memory, storage, and input/output peripherals (e.g., display, keyboard, stylus, drawing device, disk drive, Internet connection, camera/scanner, microphone, speaker, etc.). However, computing system 1500 may include circuitry or other specialized hardware for carrying out some or all aspects of the processes.

In computing system 1500, the main system 1502 may include a motherboard 1504, such as a printed circuit board with components mount thereon, with a bus that connects an input/output (I/O) section 1506, one or more microprocessors 1508, and a memory section 1510, which may have a flash memory card 1512 related to it. Memory section 1510 may contain computer-executable instructions and/or data for carrying out process 1300, process 1400. or any of the other processes described above. The I/O section 1506 may be connected to display 1512 (e.g., to display a view), a touch sensitive surface 1514 (to receive touch input and which may be combined with the display in some cases), a microphone 1516 (e.g., to obtain an audio recording), a speaker 1518 (e.g., to play back the audio recording), a disk storage unit 1520, and a media drive unit 1522. The media drive unit 1522 can read/write a non-transitory computer-readable storage medium 1524, which can contain programs 1526 and/or data used to implement process 1300, process 1400, or any of the other processes described above.

Additionally, a non-transitory computer-readable storage medium can be used to store (e.g., tangibly embody) one or more computer programs for performing any one of the above-described processes by means of a computer. The computer program may be written, for example, in a general-purpose programming language (e.g., Pascal, C, C++, Java, or the like) or some specialized application-specific language.

Computing system 1500 may include various sensors, such as front facing camera 1528 and back facing camera 1530. These cameras can be configured to capture various types of light, such as visible light, infrared light, and/or ultra violet light. Additionally, the cameras may be configured to capture or generate depth information based on the light they receive. In some cases, depth information may be generated from a sensor different from the cameras but may nonetheless be combined or integrated with image data from the cameras. Other sensors included in computing system 1500 include digital compass 1532, accelerometer 1534, and/or gyroscope 1536. Other sensors (such as dot projectors, IR sensors, photo diode sensors, time-of-flight sensors, etc.) may also be included.

While the various components of computing system 1500 are depicted as separate in FIG. 15, various components may be combined together. For example, display 1512 and touch sensitive surface 1514 may be combined together into a touch-sensitive display.

Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which may be readily separated from or combined with the features of any of the other several embodiments without departing from the scope or spirit of the various embodiments.

Some non-limiting feature combinations of the present technology are described in the aspects below.

Aspect 1. A method, comprising:
at an electronic device having a display, a first sensor, and a second sensor different than the first sensor:
 displaying a view on the display, wherein the view includes an interface object at a first location;
 detecting a first gesture based on first data from the first sensor, wherein the first gesture identifies the interface object;
 detecting a second gesture based on second data from the second sensor;
 determining a second location for the interface object based on the second gesture; and
 updating the display of the interface object from the first location to the second location in the view.

Aspect 2. The method of aspect 1, wherein the electronic device further includes a third sensor different than the first sensor and the second sensor, wherein detecting the second gesture is further based on third data from the third sensor.

Aspect 3. The method of aspect 1 or aspect 2, wherein the first sensor is a first image sensor on a first side of the electronic device and the second sensor is a second image sensor on a second side of the electronic device different than the first side.

Aspect 4. The method of any one of aspects 1-3, wherein the second sensor is touch screen sensor is integrated over the display.

Aspect 5. The method of any one of aspects 1-4, wherein the first sensor is the image sensor.

Aspect 6. The method of aspect 5, wherein the view includes image data from the image sensor of the electronic device and graphical elements generated by the electronic device overlaid onto the image data.

Aspect 7. The method of any one of aspects 1-4, wherein the view includes image data from an image sensor of the electronic device and graphical elements generated by the electronic device overlaid onto the image data.

Aspect 8. The method of any one of aspects 1-7, wherein the interface object is a graphical element generated by the electronic device.

Aspect 9. The method of any one of aspects 1-8, wherein the view is of an augmented reality environment.

Aspect 10. The method of any one of aspects 1-9, wherein the first data and the second data represent movement of one hand of a user of the electronic device.

Aspect 11. The method of any one of aspects 1-9, wherein the first data represent movement of one hand of a user of the electronic device and the second data represent movement of the electronic device.

Aspect 12. The method of any one of aspects 1-9, wherein the first data represents movement of one hand of a user of the electronic device and the second data represents other movement of the user of the device.

Aspect 13. A non-transitory computer-readable storage medium encoded with a computer program executable by an electronic device having a display, a first sensor, and a second sensor different than the first sensor, the computer program comprising instructions for:
 displaying a view on the display, wherein the view includes an interface object at a first location;
 detecting a first gesture based on first data from the first sensor, wherein the first gesture identifies the interface object;
 detecting a second gesture based on second data from the second sensor;
 determining a second location for the interface object based on the second gesture; and
 updating the display of the interface object from the first location to the second location in the view.

Aspect 14. The non-transitory computer-readable storage medium of aspect 13, wherein the electronic device further includes a third sensor different than the first sensor and the second sensor, wherein detecting the second gesture is further based on third data from the third sensor.

Aspect 15. The non-transitory computer-readable storage medium of aspect 13 or aspect 14, wherein the first sensor is a first image sensor on a first side of the electronic device and the second sensor is a second image sensor on a second side of the electronic device different than the first side.

Aspect 16. The non-transitory computer-readable storage medium of any one of aspects 13-15, wherein the second sensor is touch screen sensor is integrated over the display.

Aspect 17. The non-transitory computer-readable storage medium of any one of aspects 13-16, wherein the first sensor is the image sensor.

Aspect 18. The non-transitory computer-readable storage medium of aspect 18, wherein the view includes image data from the image sensor of the electronic device and graphical elements generated by the electronic device overlaid onto the image data.

Aspect 19. The non-transitory computer-readable storage medium of any one of aspects 13-16, wherein the view includes image data from an image sensor of the electronic device and graphical elements generated by the electronic device overlaid onto the image data.

Aspect 20. The non-transitory computer-readable storage medium of any one of aspects 13-19, wherein the interface object is a graphical element generated by the electronic device.

Aspect 21. The non-transitory computer-readable storage medium of any one of aspects 13-20, wherein the view is of an augmented reality environment.

Aspect 22. The non-transitory computer-readable storage medium of any one of aspects 13-21, wherein the first data and the second data represent movement of one hand of a user of the electronic device.

Aspect 23. The non-transitory computer-readable storage medium of any one of aspects 13-21, wherein the first data represent movement of one hand of a user of the electronic device and the second data represent movement of the electronic device.

Aspect 24. The non-transitory computer-readable storage medium of any one of aspects 13-21, wherein the first data represents movement of one hand of a user of the electronic device and the second data represents other movement of the user of the device.

Aspect 25. An electronic device comprising:
a display
a first sensor
a second sensor different than the first sensor
a processor
memory encoded with a computer program executable by the processor, the computer program having instructions for:
  displaying a view on the display, wherein the view includes an interface object at a first location;
  detecting a first gesture based on first data from the first sensor, wherein the first gesture identifies the interface object;
  detecting a second gesture based on second data from the second sensor;
  determining a second location for the interface object based on the second gesture; and
  updating the display of the interface object from the first location to the second location in the view.

Aspect 26. A method comprising:
at an electronic device having a display, a first sensor, and a second sensor different than the first sensor:
  displaying a view on the display;
  detecting a first gesture based on first data from the first sensor;
  detecting a second gesture based on second data from the second sensor;
  determining a function based on the first gesture and the second gesture;
  performing the determined function; and
  updating the display to show performance of the function.

Aspect 27. The method of aspect 26, wherein the first sensor is an image sensor.

Aspect 28. The method of aspect 26, wherein the first sensor is an accelerometer or gyroscope.

Aspect 29. The method of aspect 26, wherein the first sensor is a touch-sensitive surface.

Aspect 30. The method any one of aspects 26-29 further comprising: sending first data to a remote user as part of performing the determined function, wherein the first data depends on the first gesture and the second gesture.

Aspect 31. A non-transitory computer-readable storage medium encoded with a computer program executable by an electronic device having a display, a first sensor, and a second sensor different than the first sensor, the computer program comprising instructions for performing the method of any one of aspects 26-30.

Aspect 32. A method comprising:
at a first electronic device having a display and a communication interface:
  receiving first image data from a first remote electronic device different than the first electronic device;
  receiving first virtual object data from the first remote electronic device;
  generating a first view combining the first image data and first virtual object data; and
  displaying the generated first view.

Aspect 33. The method of aspect 32 further comprising: receiving orientation data of the first remote electronic device, wherein generating the first view is further based on the orientation data.

Aspect 34. The method of aspect 32 or aspect 33, wherein the first electronic device includes an orientation sensor, the method further comprising:
  receiving second image data from a second remote electronic device different than the first remote electronic device;
  receiving second virtual object data from the second remote electronic device;
  detecting a change in orientation of the first electronic device based on data received from the orientation sensor;
  generating a second view combining the second image data and second virtual object data; and
  in response to detecting a change in the orientation, displaying the generated second view.

Aspect 35. A non-transitory computer-readable storage medium encoded with a computer program executable by a first electronic device having a display and a communication interface, the computer program comprising instructions for performing the method of any one of aspects 31-35.

Aspect 36. A method comprising:
at an electronic device having a display and an orientation sensor:
  displaying a view on the display;
  detecting a position change of the electronic device based on orientation data from the orientation sensor;
  updating the display of the view based on the detected position change.

Aspect 37. The method of aspect 36 further comprising:
   determining a magnitude and a direction for the position changed based on the orientation data; and
   based on the magnitude and the direction, determining whether the electronic device moved away from a user of the electronic device, wherein updating the display of the view in response to a determination that electronic device moved away from the user.

Aspect 38. A non-transitory computer-readable storage medium encoded with a computer program executable by a first electronic device having a display and a communication interface, the computer program comprising instructions for performing the method of any one of aspects 36-37.

What is claimed is:

1. A method, comprising:
   at an electronic device having a display, a first sensor, and a second sensor different than the first sensor:
      displaying a view on the display, wherein the view includes an interface object at a first location, wherein the view includes image data from an image sensor of the electronic device and graphical elements generated by the electronic device overlaid onto the image data;
      detecting a first gesture based on first data from the first sensor, wherein the first gesture identifies the interface object;
      detecting a second gesture based on second data from the second sensor;
      determining a second location for the interface object based on the second gesture; and
      updating the display of the interface object from the first location to the second location in the view.

2. The method of claim 1, wherein the electronic device further includes a third sensor different than the first sensor and the second sensor, wherein detecting the second gesture is further based on third data from the third sensor.

3. The method of claim 1, wherein the first sensor is a first image sensor on a first side of the electronic device and the second sensor is a second image sensor on a second side of the electronic device different than the first side.

4. The method claim 1, wherein the second sensor is a touch screen sensor integrated over the display.

5. The method of claim 1, wherein the first sensor is the image sensor.

6. The method of claim 5, wherein the first gesture is a hand movement in the field of view of the image sensor.

7. The method of claim 1, wherein the first sensor is a first image sensor on a first side of the electronic device and the second sensor is a touch screen sensor on a second side of the electronic device different than the first side.

8. The method of claim 1, wherein the interface object is a graphical element generated by the electronic device.

9. The method of claim 1, wherein the view is of an augmented reality environment.

10. The method of claim 1, wherein the first data and the second data represent movement of one hand of a user of the electronic device.

11. The method of claim 1, wherein the first data represent movement of one hand of a user of the electronic device and the second data represent movement of the electronic device.

12. The method of claim 1, wherein the first data represents movement of one hand of a user of the electronic device and the second data represents other movement of the user of the device.

13. A non-transitory computer-readable storage medium encoded with a computer program executable by an electronic device having a display, a first sensor, and a second sensor different than the first sensor, the computer program comprising instructions for:
      displaying a view on the display, wherein the view includes an interface object at a first location, wherein the view includes image data from an image sensor of the electronic device and graphical elements generated by the electronic device overlaid onto the image data;
      detecting a first gesture based on first data from the first sensor, wherein the first gesture identifies the interface object;
      detecting a second gesture based on second data from the second sensor;
      determining a second location for the interface object based on the second gesture; and
      updating the display of the interface object from the first location to the second location in the view.

14. The non-transitory computer-readable storage medium of claim 13, wherein the electronic device further includes a third sensor different than the first sensor and the second sensor, wherein detecting the second gesture is further based on third data from the third sensor.

15. The non-transitory computer-readable storage medium of claim 13, wherein the first sensor is a first image sensor on a first side of the electronic device and the second sensor is a second image sensor on a second side of the electronic device different than the first side.

16. The non-transitory computer-readable storage medium of claim 13, wherein the second sensor is a touch screen sensor integrated over the display.

17. The non-transitory computer-readable storage medium of claim 13, wherein the first sensor is the image sensor.

18. The non-transitory computer-readable storage medium of claim 17, wherein the first gesture is a hand movement in the field of view of the image sensor.

19. The non-transitory computer-readable storage medium of claim 13, wherein the first sensor is a first image sensor on a first side of the electronic device and the second sensor is a touch screen sensor on a second side of the electronic device different than the first side.

20. An electronic device comprising:
   a display;
   a first sensor;
   a second sensor different than the first sensor;
   a processor;
   memory encoded with a computer program executable by the processor, the computer program having instructions for:
      displaying a view on the display, wherein the view includes an interface object at a first location, wherein the view includes image data from an image sensor of the electronic device and graphical elements generated by the electronic device overlaid onto the image data;
      detecting a first gesture based on first data from the first sensor, wherein the first gesture identifies the interface object;
      detecting a second gesture based on second data from the second sensor;
      determining a second location for the interface object based on the second gesture; and
      updating the display of the interface object from the first location to the second location in the view.

* * * * *